(12) United States Patent
Qaddoura

(10) Patent No.: US 9,151,953 B2
(45) Date of Patent: Oct. 6, 2015

(54) POINTER TRACKING FOR EYE-LEVEL SCANNERS AND DISPLAYS

(71) Applicant: Amazon Technologies, Inc., Reno, NV (US)

(72) Inventor: Fareed Adib Qaddoura, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 96 days.

(21) Appl. No.: 14/108,837

(22) Filed: Dec. 17, 2013

(65) Prior Publication Data

US 2015/0168727 A1   Jun. 18, 2015

(51) Int. Cl.
*G06F 3/00* (2006.01)
*G02B 27/01* (2006.01)

(52) U.S. Cl.
CPC ............ *G02B 27/0172* (2013.01); *G06F 3/005* (2013.01)

(58) Field of Classification Search
CPC ...... G02B 27/01; G02B 27/017; G02B 26/10; G02B 2027/014; G02B 2027/0138; G02B 2027/0178; G06F 3/005; G06F 3/007
See application file for complete search history.

(56) References Cited

U.S. PATENT DOCUMENTS

| 6,091,546 | A  | * | 7/2000  | Spitzer ............................. 345/8 |
|---|---|---|---|---|
| 2002/0149681 | A1 |   | 10/2002 | Kahn et al. |
| 2007/0210983 | A1 |   | 9/2007  | Dove et al. |
| 2013/0069985 | A1 | * | 3/2013  | Wong et al. ................... 345/633 |
| 2013/0131985 | A1 |   | 5/2013  | Weiland et al. |
| 2013/0346168 | A1 | * | 12/2013 | Zhou et al. ..................... 345/175 |
| 2014/0291396 | A1 | * | 10/2014 | Molisimo et al. ............. 235/383 |

OTHER PUBLICATIONS

International Search Report and Written Opinion of PCT Application No. US2014/070418 with a mailing date of May 20, 2015.

* cited by examiner

*Primary Examiner* — Regina Liang
(74) *Attorney, Agent, or Firm* — Athorus, PLLC

(57) ABSTRACT

A wearable computer device may include multiple imaging devices or other sensors working in concert to recognize conditions, objects or areas of an environment in which the wearable computer device is situated. The device may include a imaging device and a sensor, which may but need not be a imaging device, for sensing and capturing information regarding the environment. The sensor may be configured to perform one or more specific tasks, such as recognizing particular items, and the imaging device may be generally configured to perform multiple tasks. Upon the execution of a specific task by the sensor, information or instructions regarding the specific task may be provided to a wearer of the device, or may cause the imaging device to automatically operate to gather further information. Such information gathered from the imaging device or the sensor may be provided to the user, such as on a computer display mounted to the device.

24 Claims, 9 Drawing Sheets

US 9,151,953 B2

POINTER TRACKING FOR EYE-LEVEL SCANNERS AND DISPLAYS

BACKGROUND

Currently, some wearable computer devices include cameras or other optical sensors for capturing still or moving images. Such cameras may be used to capture images along an axis defined by an extension of a body on which the wearable computer devices are worn. For example, a wearable computer device worn about a head of a human may be mounted to an article of clothing or accessory such as a cap or pair of eyeglasses, and may include a camera aligned to capture images in a direction in which the human is looking, or in a direction in which the head is pointed. In this regard, the wearable computer device may functionally record or replicate the field of view of the human, such as by capturing images or other information that the human sees, based on the orientation of the wearable computer device about the head. Such images or other information, or portions thereof, may then be presented on a computer display (e.g., a miniaturized head-up display in a field of view of the human) that may be viewed by either or both of the human's eyes.

While most wearable computer devices having cameras or other optical sensors may capture images along a selected axis or in a selected direction, such devices are typically unable to capture images of objects or features that are not within a field of view of the user, i.e., along axes or in directions other than the axis or direction of the field of view. Moreover, such devices typically may not be programmed or configured to automatically capture images within such fields of view, or to automatically recognize objects or features that are expressed within such images. Therefore, the functionality of most wearable computer devices is hindered in that the extent of their capacity to analyze such images, or to provide information to a user regarding contents of such images, is limited to what is already being viewed by the user. Furthermore, cameras or other optical sensors that are mounted to or provided within wearable computer devices may typically be trained only upon a manual movement of the user, such as a twist or tilt of a head.

DETAILED DESCRIPTION

As is set forth in greater detail below, the present disclosure is directed to enhancing the capacity of wearable computer devices to recognize and provide information to a user regarding items that are within range of the wearable computer devices, e.g., on one or more computer displays or other computer output devices. Specifically, the systems and methods disclosed herein are directed to wearable computing devices which may include a primary imaging device (e.g., a digital camera) or other sensor for capturing information, e.g., one or more still or moving images along a trainable axis or in a trainable direction, as well as a secondary imaging device or sensor. The secondary imaging device or other sensor may be configured to scan or otherwise analyze information in a vicinity of the wearable computer device in search for one or more predefined items, conditions, statuses or events, particularly within a specific depth of view of the sensor. Such items, conditions, statuses or events may be recognized based on any attribute thereof.

When the secondary imaging device or sensor recognizes one or more of the predefined items, conditions, statuses or events, an indicator such as a signal or an alarm may be provided to the primary imaging device or sensor, to a wearer of the wearable computer device, or to any other apparatus or user thereof. The indicator may be shown on a computer display, e.g., an eye-level display associated with the wearable computer device, or provided by any other computer output device such as a speaker or printer, or in another format, such as a text message or electronic mail message, and any action may be taken in response to the indicator. For example, the wearer may then manually train the primary imaging device along a particular axis or in a particular direction (i.e., to evaluate the item or condition directly). Alternatively, the primary imaging device may be automatically trained along the particular axis or in the particular direction.

Figure 1A:
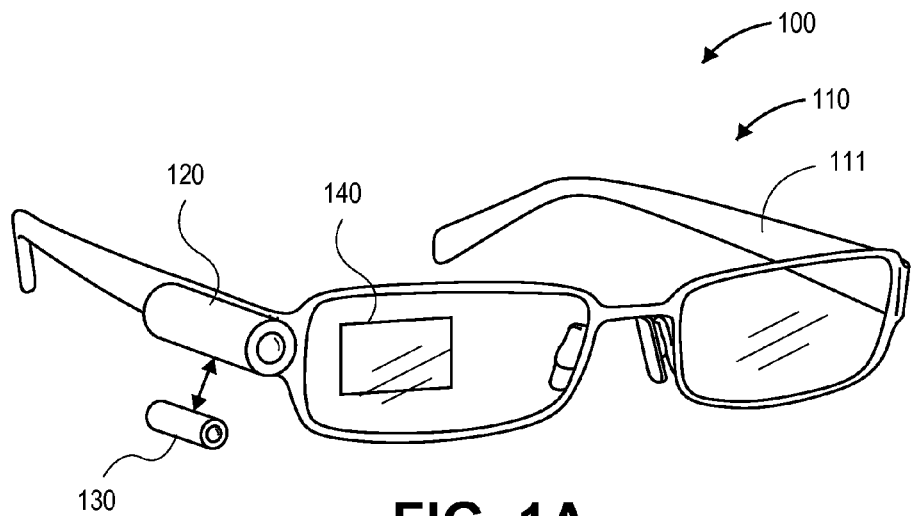
FIGS. 1A, 1B and 1C are views of eye-level scanners, in accordance with embodiments of the present disclosure.
Figure 1B:
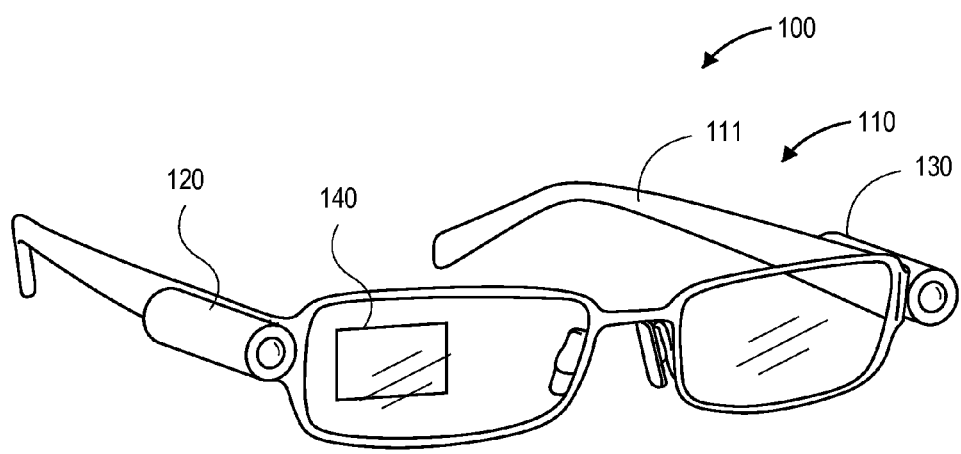
Figure 1C:
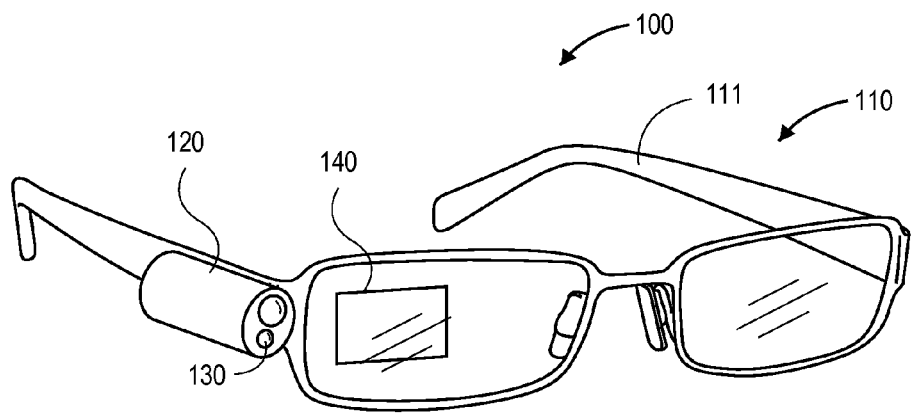

Referring to FIGS. 1A, 1B and 1C, systems 100 having eye-level scanners 110 are shown. The eye-level scanner 110 of FIG. 1A includes an eyeglass frame 111, a primary imaging device 120 mounted to the eyeglass frame 111, a secondary sensor 130 and an eye-level display 140. The eye-level scanner 110 of FIG. 1B includes a primary imaging device 120 and a secondary sensor 130 mounted to opposite sides of an eyeglass frame 111, as well as an eye-level display 140. The secondary sensors 130 of FIG. 1A or FIG. 1B may be functionally joined with the primary imaging devices 120, or with one or more external networks (not shown), through wireless communications over a standard protocol such as Bluetooth® or any Wireless Fidelity (or "WiFi") protocol. The eye-level scanner 110 of FIG. 1C includes an eyeglass frame 111 and a primary imaging device 120 mounted thereto, along with a secondary sensor 130 that may be physically and/or functionally joined to the primary imaging device 120 and an eye-level display 140.

Accordingly, the systems and methods of the present disclosure may include a primary camera or sensor that may be configured to perform any number of general functions, and a secondary camera or sensor that may be configured to perform one or more specific functions, e.g., to search for one or more specific items or conditions. The primary cameras or sensors and the secondary cameras or sensors of the present disclosure may be provided in a contiguous unit, or may be provided as discrete parts of a system that are in communication with one another. Moreover, although some of the primary imaging devices 120 or the secondary sensors 130 of FIGS. 1A and 1C are shown as mounted to an eyeglass frame 111 to be worn about a head of a user, the systems and methods disclosed herein are not so limited, and one or more of the primary imaging device 120 or a secondary sensor 130 may, but need not, be worn or mounted to any body part. Similarly, although the eye-level displays 140 of FIGS. 1A, 1B and 1C are shown as configured within a lens of the eyeglass frame 111, the systems and methods disclosed herein are not so limited, and information may be provided to a user of the systems 100, or to other individuals or machines, via any form of output device, including displays, speakers, printers or the like, which need not be dedicated for use in associated with the eye-level scanner 110, or worn by the user.

Those of ordinary skill in the pertinent arts recognize that as computers continue to evolve, computer-related components such as circuit boards, processors, memory, data stores or other storage devices, and any other electrical components are becoming smaller and smaller over time. According to commonly accepted historical observations, computer-related performance metrics such as an average number of transistors on an integrated circuit, average processing speeds, average memory capacities and average pixel densities of computer displays have all seen persistent exponential or near-exponential growth over the last several decades. Technological improvements in computer technology have enabled computer components to be miniaturized, thereby increasing the numbers and types of environments and applications in which such components may be utilized. Further, computers now include or may be associated with multiple accessories or peripheral devices such as digital cameras or other sensors, printers, displays, speakers and the like. Such accessories or peripherals may be physically mounted to or otherwise joined with the computers, or functionally or operatively joined with the computers via one or more wired or wireless means.

Modern optical sensors such as digital cameras operate by electronically capturing reflected light from objects and assigning quantitative values to one or more aspects of the reflected light, such as pixels. Unlike a traditional camera, which directs light passing through an optical element toward an array of light-sensitive chemical receptors that are embedded in a film, and exploits the chemical reactions occurring thereon to generate an image associated with the passed light, a digital camera may include one or more sensors having one or more filters associated therewith. The sensors of a digital camera may capture information regarding any number of pixels of the reflected light corresponding to one or more base colors (e.g., red, green or blue) expressed in the reflected light, and store values associated with the pixel colors as one or more data files in a data store or transmit such values to an external computer device for further analysis or reproduction. A digital camera may include one or more onboard data stores, as well as one or more removable data stores (e.g., flash memory devices), and the data files stored in the one or more data stores may be printed onto paper, displayed on one or more computer displays, or subjected to one or more analyses, such as to identify items expressed therein.

A digital camera may capture one or more images of items within its field of view, which is determined as a function of a distance between a sensor and a lens, viz., a focal length, within the camera. Where an object appears within a depth of field, or a distance within the field of view where the clarity and focus is sufficiently sharp, a digital camera may capture light that is reflected off objects of any kind to a sufficiently high degree of resolution using the sensor, and store information regarding the reflected light in one or more data files.

Information and/or data regarding features or objects expressed in a digital image may be extracted from the image in any number of ways. For example, a color of a pixel, or a group of pixels in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, a texture of a feature or object expressed in a digital image may be identified using one or more computer-based methods, such as by identifying changes in intensities within regions or sectors of the image, or by defining areas of a image corresponding to specific surfaces. Furthermore, outlines of objects may be identified in a digital image using one or more algorithms or machine-learning tools. For example, some such algorithms or tools may recognize edges, contours or outlines of objects in the digital image, or of portions of objects, and may match the edges, contours or outlines of the objects against a database containing information regarding edges, contours or outlines of known objects.

Like other computer components, digital cameras that may be associated with computers have also seen concomitant decreases in size and increases in utilization over the last several years. Digital cameras are now frequently included in portable computing devices such as smartphones or tablet computers, and feature sufficiently small lenses, sensors, filters, apertures, shutters or other components, as well as motors and/or controllers for manually or automatically operating one or more of the components, or for reorienting the axis or direction of the cameras. Such cameras may further include any type of lens, such as fixed-focus or fixed-zoom lenses, as well as optical zoom or digital zoom lenses. Further, such cameras may also include pointing devices such as laser or light-emitting diode (or "LED") pointers or pointing devices for aiming or orienting cameras. For example, an LED or laser pointer may illuminate an object externally, or may be used to illuminate a shutter or other finder window, and a distance or other metric regarding the object may be determined using the pointer or any other means. Such a distance or metric may be used to configure one or more cameras or sensors, i.e., by adjusting a focal length of a camera.

Moreover, other forms of optical computer-based sensors, including bar code readers, data tag readers, color sensors, temperature sensors, heat sensors or motion sensors, may also be included in computer equipment if such sensors are appropriately sized. Additionally, such sensors may be directly incorporated into a camera or other optical sensor. For example, a bar code reader associated with a computer device may read and recognize a bar code such as a one-dimensional bar code or a two-dimensional quick response bar code, or "QR" bar code, by illuminating the bar code using a light source (e.g., a diode, a charge-coupled device or a laser), and measuring intensities of light reflecting off alternating white and black portions of the bar code. Alternatively, a bar code reader may read and recognize a bar code by capturing an image of the bar code, and performing one or more analyses of the image in order to decode the bar code. A data tag reader may capture information regarding one or more data tags, such as bokodes, which may include one or more LED devices covered with masks or lenses that may be captured or recorded using a digital camera or other imaging device, and interpreted in order to identify any information or data associated therewith. Those of ordinary skill in the pertinent art would further recognize that imaging devices such as digital cameras may be used to recognize other items or identifiers, including characters, numbers, symbols or colors, which may be further associated with other information or data.

The systems and methods of the present disclosure are directed to providing wearable computer devices having one or more cameras or sensors, such as the devices 110 of FIGS. 1A-1C. Such devices may include a primary camera or sensor, such as a camera dedicated to the performance of one or more general tasks, as well as a secondary camera or sensor, which may also be a camera, and may be programmed or configured for the performance of one or more specific tasks relating to an environment in which a device 110 is situated, such as by recognizing items, conditions, statuses or events based on images or other digital data that may be captured by the primary camera or sensor, or the secondary camera or sensor. The secondary camera or sensor may also sense temperatures, colors or other environmental information, which may also be analyzed in order to identify an item, a condition, a status or an event associated therewith.

According to one embodiment of the present disclosure, once an item, a condition, a status or an event has been recognized using the secondary camera or sensor, the primary camera or sensor may be automatically trained or otherwise operated to capture one or more images that may be associated with the item, the condition, the status or the event. By training the secondary camera or sensor to search for a small subset of available information associated with a particular function, such to search for bar codes, bokodes, characters, numbers, symbols, colors, trademarks, identifiers or other information, particularly within a specific field of view or at a specific depth of field, the capacity of the wearable computing device to identify information may be greatly enhanced.

According to another embodiment of the present disclosure, a user wearing a wearable computing device of the present disclosure may locate an object of interest. The user may place the object in a field of view of the computing device, and illuminate the object with a pointer. A specialized sensor (e.g., a camera, temperature sensor, heat sensor or motion sensor) associated with the wearable computer device may determine whether the object is of the type that the specialized sensor is configured to detect. If the illuminated object is one of the type of objects that the system is configured to detect, the system may read in on a marking on the object (e.g., a bar code, a bokode, a character, a number, a symbol or a color) with the sensor, which may collect data regarding the marking and transmit the data to a computing unit for processing. Any relevant information collected from the marked object, or relating to the marked object, may be generated and provided to the user, such as by transmitting a signal, sounding an alarm or displaying at least some of the information on an eye-level display of the computing device.

According to yet another embodiment of the present disclosure, information regarding triggering events, metrics or standards may be programmed into a computing unit of a wearable scanning device including a primary sensor and a secondary sensor. The secondary sensor may be configured to automatically scan an environment in which the scanning device is situated in order to determine whether one or more of the triggering events, metrics or standards is observed. Such metrics may relate to any predetermined items, conditions, statuses or events, e.g., an identification of a specific object or identifier (such as a bar code, a bokode, a character, a number, a symbol or a color on an item), a sensed temperature or other environmental condition, or motion of one or more items within the field of view of the secondary sensor. Once one or more of the triggering events, metrics or standards is detected, a primary sensor may take a reading of any aspect of the environment in which a triggering metric was observed. The primary sensor may further capture information regarding the aspect of the environment in which the triggering events, metrics or standards were observed, and transmit such information to the computing unit of the wearable scanning device, which may display some or all of the information associated with the aspect of the environment on an eye-level display, or provide some or all of the information to the user in any other manner.

According to still another embodiment of the present disclosure, a wearable device having a computing unit and multiple sensors is programmed with information regarding one or more items, conditions, statuses or events. When one of the sensors detects an object, the computing unit may determine whether the object may be associated with the programmed information. If the object is associated with the information, the computing unit may select one of the sensors to capture further data regarding the object, such as by reconfiguring the sensor that detected the object, or by configuring one or more of the other sensors, to capture data regarding the object. The data captured from the various sensors may be presented to the user of the wearable device or another user, such as on a head-up display or in any other format.

The systems and methods disclosed herein may be used in any number of applications. For example, at a construction site, a secondary sensor of a wearable scanning device or computer device may search for extreme temperature conditions, high levels of flammable materials, or any other potential hazard, and automatically train a primary camera in a direction of the potentially hazardous condition, or otherwise alert a user of the device to the potentially hazardous condition. As another example, while a doctor performs surgery on a patient, a secondary camera may capture and evaluate images of the patient, including the presence of blood, flesh or bone matter, and provide information regarding the identified matter to the user, even while a primary camera records the surgery.

As yet another example, a wearable scanning device or computing device may be used to identify evolving traffic patterns using one or more sensors, i.e., by automatically configuring one or more sensors to recognize aspects of the patterns, such as red brake lights, green traffic lights, or motion of automobiles or persons in traffic, and to reorient one or more additional sensors in a specific direction, or to alert a driver, when such patterns are encountered. As still another example, a worker in a fulfillment center may perform one or more functions while wearing a wearable computing device having a primary camera and a secondary sensor. The secondary sensor may search for bar codes or other like identifiers, items or other features of the bar code or identifiers, which may be captured and identified by the primary camera, and any relevant information regarding bar codes, items or features to the user. In this regard, the wearable computing device may aid the user in conducting an inventory assessment or quality control analysis, in stowing or retrieving items, or in returning the items to stock.

Figure 2:
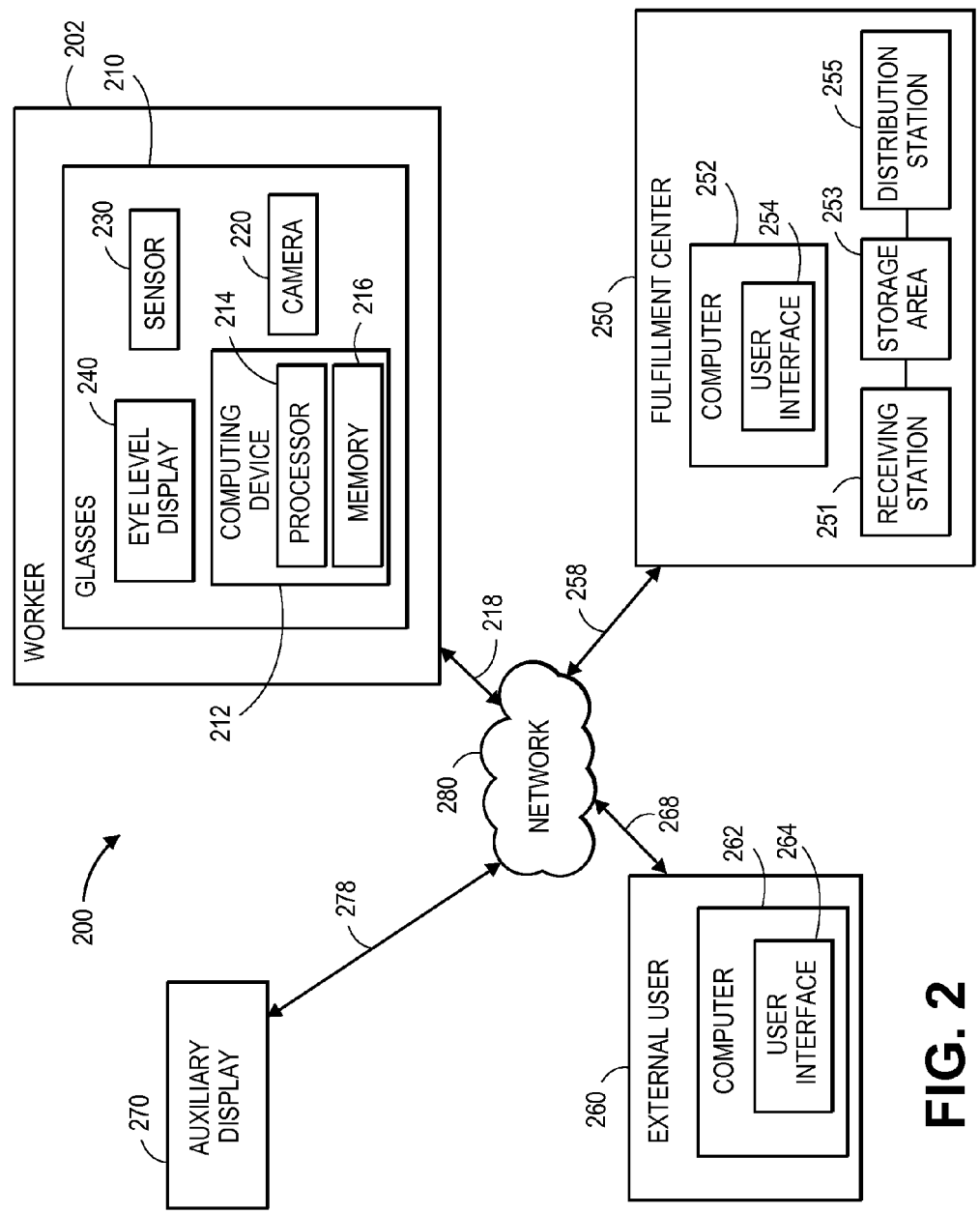
FIG. 2 is a block diagram of components of a system including an eye-level scanner, in accordance with embodiments of the present disclosure.

As is discussed above, the wearable computer devices of the present disclosure may be used in any number of systems, and in any number of applications. Referring to FIG. 2, a block diagram of one system 200 including an eye-level scanner device in the form of glasses 210 worn by a worker 202 is shown. The system 200 further includes a fulfillment center 250, an external user 260 and an auxiliary display 270 that are connected to one another across a network 280, such as the Internet.

As is shown in FIG. 2, the glasses 210 include a computing device 212 having a processor 214 and a memory 216 for performing one or more general or specific functions, and may be connected to the network 280, as is indicated by line 218. The glasses 210 further include a camera 220, a sensor 230 and an eye-level display 240.

The computing unit 212 and the processor 214 may be in communication with the memory 216, the camera 220, the sensor 230 and/or the eye-level display 240, or other external components via the network 280. The memory 216 may contain computer program instructions that the processor 214 may execute in order to implement one or more embodiments of the present disclosure, and may further include random access memory ("RAM"), read-only memory ("ROM") or any other form of persistent and/or non-transitory computer-readable media. The memory 216 may further store an operating system thereon, for the purpose of providing general administration and operation functions for the processor 214 and other components of the glasses 210, as well as other information for implementing any aspects of the present disclosure.

The camera 220 may be any form of optical recording device mounted to or otherwise associated with the glasses 210, e.g., a digital camera that may be mounted to a frame of the glasses 210, such as the primary imaging device 120 mounted to the frame 111 of FIGS. 1A, 1B and 1C. For example, the camera 220 may be used to photograph or otherwise record images of the structures, facilities or other elements for storing items inside the fulfillment center 250, as well as the items within the fulfillment center 250, or for any other purpose. The sensor 230 may be any form of sensing device for detecting conditions in an environment in which the glasses 210 are situated, and may be operatively or functionally joined with the camera 220 by any wired or wireless means, such as is shown in FIGS. 1A, 1B and 1C. Any number or type of sensor may be provided in accordance with the present disclosure, including but not limited to cameras or other optical sensors, temperature sensors, heat sensors, radiation sensors or position and/or orientation sensors. Those of ordinary skill in the pertinent art will recognize that the sensor 230 may be a camera, and that the glasses 210 may include any number of cameras or sensors.

The eye-level display 240 may include any type or form of output device that may be positioned at or near an eye-level of a user. The eye-level display 240 may thus include a display device that is mounted or visible within a field of view of the user, including but not limited to a sufficiently small monitor or a head-up display projected upon a lens of the glasses 210. For example, the eye-level display 240 may incorporate any of a number of active or passive display technologies, such as electronic ink, liquid crystal display (or "LCD"), LED or organic light-emitting diode (or "OLED") displays, cathode ray tubes (or "CRT"), projection screens or the like. Those of ordinary skill in the pertinent art would further realize that any other form of output device, such as an audio speaker, may be associated with the eye-level display 240, or may act as a substitute for the eye-level display 240.

The fulfillment center 250 may be any facility that is adapted to receive, store, process and/or distribute items. The fulfillment center 250 may operate one or more order processing and/or communication systems using a computing device such as a computer 252 and/or software applications having one or more user interfaces 254 (e.g., a browser), or through one or more other computing machines that may be connected to the network 280, as is indicated by line 258, in order to transmit or receive information in the form of digital or analog data, or for any other purpose. The computer 252 may also operate or provide access to one or more reporting systems for receiving or displaying information or data regarding workflow operations, and may provide one or more interfaces, such as the user interface 254, for receiving interactions (e.g., text, numeric entries or selections) from one or more operators, users or workers in response to such information or data. The computer 252 may further operate or provide access to one or more engines for analyzing the information or data regarding the workflow operations, or the interactions received from the one or more operators, users or workers.

The receiving station 251 may include any apparatuses that may be required in order to receive shipments of items from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 253 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 255 may include one or more regions or stations where items that have been retrieved from a designated storage area may be evaluated, prepared and packed for delivery to addresses, locations or destinations specified by customers, also by way of carriers such as cars, trucks, trailers, freight cars, container ships or cargo aircraft (e.g., manned aircraft or unmanned aircraft, such as drones).

The fulfillment center 250 may further include one or more control systems that may generate instructions for conducting operations at one or more of the receiving station 251, the storage area 253 or the distribution station 255, which may be associated with the computer 252 or one or more other computing machines, and may communicate with the worker 202, the external user 260 or the auxiliary display 270 over the network 280, as indicated by line 258, through the sending and receiving of digital data. Additionally, the fulfillment center 250 may include one or more systems or devices (not shown in FIG. 2) for determining a location of one or more elements therein, such as cameras or other image recording devices. Furthermore, the fulfillment center 250 may also include one or more workers or staff members, including but not limited to the worker 202, who may handle or transport items within the fulfillment center 250. Such workers may operate one or more computing devices for registering the receipt, retrieval, transportation or storage of items within the fulfillment center, such as the computer 252, or a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The external user 260 may be any entity or individual, other than the worker 202, that utilizes one or more computing devices, such as the computer 262 or any other like machine that may operate or access one or more software applications including one or more user interfaces 264. The computer 262 may be connected to or otherwise communicate with the worker 202 and/or the glasses 210, the fulfillment center 250 or the auxiliary display 270 through the network 280, as indicated by line 268, by the transmission and receipt of digital data. For example, the external user 260 may review information identified by the camera 220 or the sensor 230 on the user interface 264, or perform any other functions, using the computer 262, which, like the computer 252, may be a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The auxiliary display 270 may be any form of external display device on which information, such as information identified by the camera 220 or the sensor 230, may be displayed. Like the eye-level display 240, the auxiliary display 270 may incorporate any of a number of active or passive display technologies, such as electronic ink, LCD, LED, OLED, CRT, projection screens or the like. In particular, because the auxiliary display 270 need not be limited by any physical constraints, the auxiliary display 270 may, in accordance with some embodiments, take the form of a large-scale monitor, television screen or ribbon-board display.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "worker," by "glasses," by a "fulfillment center," or by an "external user" may be automated steps performed by their respective computer systems, or implemented within software modules (or computer programs) executed by one or more general purpose computers. Moreover, process steps described as being performed by a "worker," by "glasses," by a "fulfillment center," or by an "external user" may be typically performed by a human operator, but could, alternatively, be performed by an automated agent.

The worker 202, the fulfillment center 250 and/or the external user 260 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the glasses 210 may be adapted to transmit information or data in the form of synchronous or asynchronous messages to the fulfillment center computer 252, the external user 260, the auxiliary display 270 or another computer device in real time or in near-real time, or in one or more offline processes, via the network 280. Those of ordinary skill in the pertinent art would recognize that the worker 202, the fulfillment center 250 and/or the external user 260 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers, such as the computing device 212, the computer 252 or the computer 260, or any computers or control systems utilized by the worker 202, the fulfillment center 250 and/or the external user 260 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
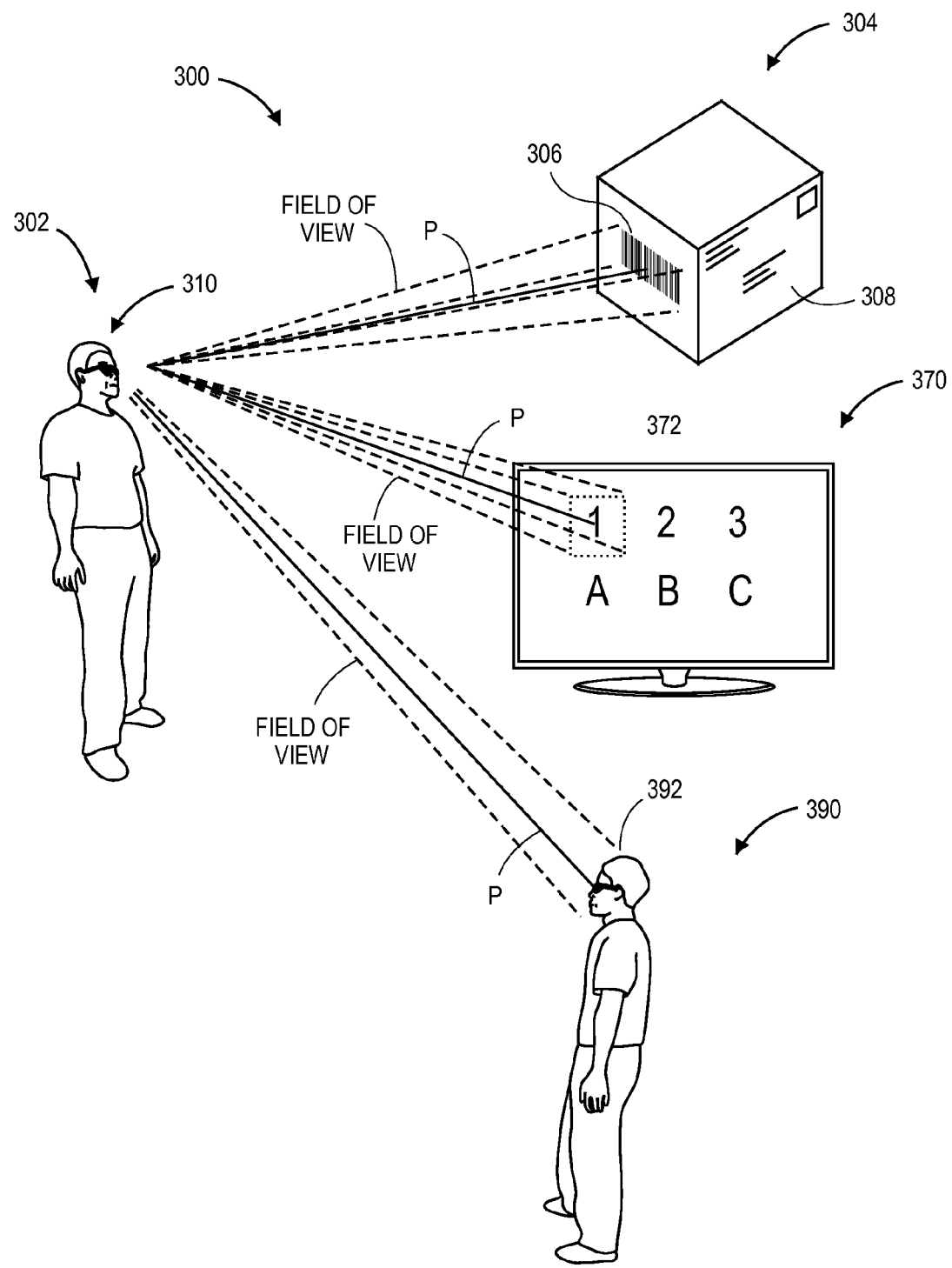
FIG. 3 is a system including an eye-level scanner in use, in accordance with embodiments of the present disclosure.

As is discussed above, the systems and methods of the present disclosure may be used to evaluate any type of items, conditions, statuses or events. Referring to FIG. 3, a view 300 of an eye-level scanner 310 in use by a user 302 is shown. The eye-level scanner 310 is shown with a variety of fields of view illuminated by a pointer P. For example, while wearing the eye-level scanner 310, the user 302 may place a parcel 304 in a field of view and illuminate one or more markings on the parcel 304, such as a bar code 306 or an address label 308. A secondary camera or sensor associated with the eye-level scanner 310 having a pointer P may identify the markings, e.g., the bar code 306 or the address label 308, as such, and a primary camera or sensor may capture one or more images of the markings, or otherwise read and interpret the markings. The pointer P may act as a guide for the primary camera or sensor, which may be manually or automatically trained to recognize the pointer, or to capture the markings, and may also serve as a basis for identifying a distance to the markings. Once the markings have been read and interpreted, the eye-level scanner 310 may take any corresponding action, including to provide information regarding the parcel 304 to the user 302 or to any other entity or individual, such as a worker at the fulfillment center 250 or the external user 260 of FIG. 2, or to display at least some of the information in an eye-level display or other computer display, such as the auxiliary computer display 370.

Similarly, while wearing the eye-level scanner 310, the user 302 may also place the auxiliary display 370 or another user 390 in a field of view of the eye-level scanner. A secondary camera or sensor associated with the eye-level scanner 310 having a pointer P may recognize one or more characters 372 displayed on the auxiliary display 370, or recognize a face 392 of the other user 390, and a primary camera or sensor may capture one or more images of the auxiliary display 370 or the face 392, and the characters 372 or the face 392 may be identified accordingly. Once the characters 372 or the face 392 have been identified, the eye-level scanner 310 may take any corresponding action, including to provide information regarding the characters 372 on the auxiliary display 370 or the other user 390 to the user 302, e.g., by displaying such information on an eye-level display, or to any other entity or individual.

Figure 4:
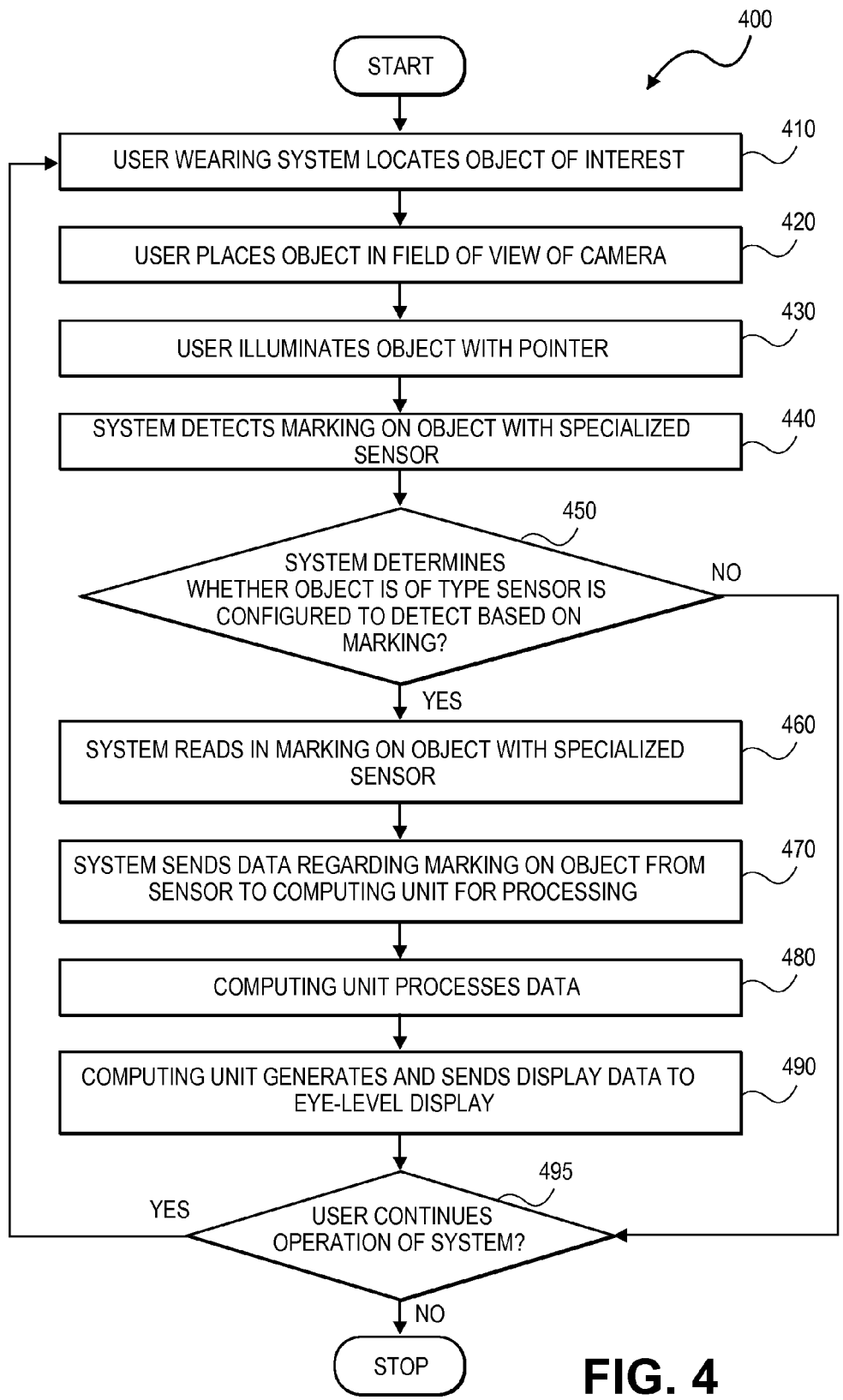
FIG. 4 is a flow chart of one process for evaluating items using eye-level scanners, in accordance with embodiments of the present disclosure.

As is discussed above, a wearable computer device of the present disclosure may be trained to determine whether objects within a field of view and/or at a depth of field of a camera or other sensor are of a predetermined type or kind, and to evaluate the objects to identify further information regarding the objects. Referring to FIG. 4, a flow chart 400 representing one embodiment of a process for evaluating items using eye-level scanners is shown. At box 410, a user wearing a scanning system in accordance with some embodiments of the present disclosure locates an object of interest, and at box 420, the user places the object within his or her field of view. For example, referring again to FIG. 3, the user 302 wearing the eye-level scanner 310 may locate and place the parcel 304, the auxiliary display 370 or the other user 380 in his or her field of view as shown.

At box 420, the user illuminates the object with a pointer, and at box 440, the system detects a marking on the object with a specialized sensor, e.g., a camera or other sensor specifically directed to recognizing such markings. The pointer may be used to calculate a distance to the object, or to otherwise guide the specialized sensor to a location or specific aspect of the object. At box 450, the system determines whether the marking on the object, or the object itself, is of a type that the specialized sensor is configured to detect. For example, where the specialized sensor is adapted to identify and interpret text, numbers or markings such as bar codes, the system determines, at box 450, whether the marking detected at box 440 is a body of text or numbers or a marking such as a bar code, a bokode, a QR code, a character, a number, a symbol, or a color. If the marking on the object is not of a type that the specialized sensor is adapted to identify, then the process advances to box 495.

If the marking is of a type that the specialized sensor is adapted to detect, then the process advances to box 460, where the system reads in the marking on the object, and to box 470, where the system sends data regarding the marking on the object to a computing unit for processing. For example, where the marking on the object is a bar code, the system may recognize the bar code as such, read and decode the bar code, and send the decoded bar code to a computing unit for further analysis.

At box 480, the computing unit processes the data, and at box 490, the computing unit generates and sends display data to the eye-level display. For example, the computing unit may identify an object based on a decoded bar code, and may further identify information regarding the object, which may be displayed on an eye-level display, such as the eye-level display 140 of the eye-level scanner 110 of FIG. 1A, 1B or 1C. Any type of information or data that may be identified based on the processing of the data at box 480 may be provided to the user, such as audio, video or multimedia information, in accordance with the present disclosure.

At box 495, the system determines whether the user intends to continue operations with the system. If the user continues to operate the system, then the process returns to box 410, where the user locates another object of interest. If the user no longer intends to operate the system, then the process ends.

Accordingly, the systems and methods of the present disclosure may configure an eye-level camera or other sensor to recognize one or more markings or other indicia, and to determine whether a particular item, condition, status or event may be associated with the indicia. Once an item, condition, status or event has been associated with the indicia, information may be identified regarding the item, condition, status or event, and provided to a user on an eye-level display, or in any other manner.

Figure 5:
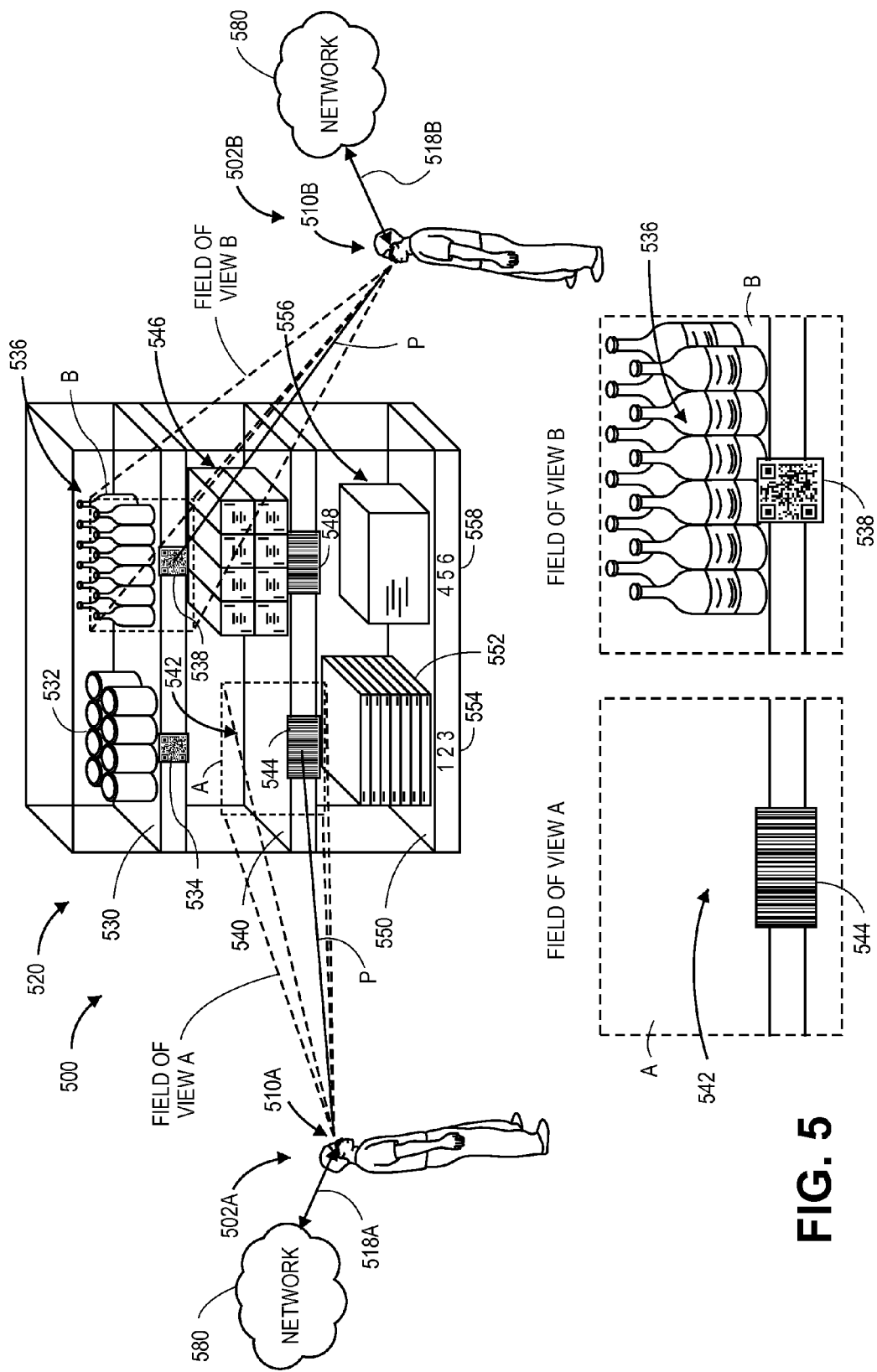
FIG. 5 is a system including eye-level scanners in use, in accordance with embodiments of the present disclosure.

Referring to FIG. 5, a system 500 including eye-level scanners 510A, 510B in use is shown. The system 500 includes a shelving system 520 having a plurality of shelves 530, 540, 550 including spaces 532, 536, 542, 546, 552, 556 for accommodating items, as well as identifiers 534, 538, 544, 548, 554, 558 associated with such spaces.

As is shown in FIG. 5, the eye-level scanner 510A is worn by a user 502A, and the eye-level scanner 510B is worn by a user 502B. The user 502A may place the space 534 in the field of view of the eye-level scanner 510A, and may align the pointer onto the identifier 544, viz., a one-dimensional bar code. According to the systems and methods of the present disclosure, one or more sensors of the eye-level scanner 510A may identify the space 542 based on the identifier 544, and recognize that the space 542 is empty. Therefore, upon identifying that the space 542 is empty, information regarding the space 542 may be displayed on an eye-level display of the eye-level scanner 510A (e.g., a message such as "Space 542 is Empty," or "Inventory Required in Space 542" may be displayed), transmitted from the eye-level scanner 510A to an external computing device over the network 580, or otherwise provided to the user 502A.

Similarly, the user 502B may place the space 536 in the field of view of the eye-level scanner 510B, and may align the pointer onto the identifier 538, viz., a QR bar code. One or more sensors of the eye-level scanner 510B may identify the space 536 based on the identifier 538, and recognize that the space 536 includes a particular number of items. Upon identifying the space 536 and the number of items therein, information regarding the space 538 may be displayed on an eye-level display of the eye-level scanner 510B (e.g., "Twelve Bottles of Chardonnay in Space 536"), transmitted from the eye-level scanner 510B to an external computing device over the network 580, or otherwise provided to the user 502B.

Therefore, the systems and methods of the present disclosure may be employed to identify items and to automatically evaluate a status of the items, e.g., to conduct an inventory assessment or quality control analysis. The pointers of the present disclosure may take any form, and may be used to provide guidance to one or more sensors, which may be manually or automatically trained to locate and follow a pointer on an item, or to calculate a distance to the item (e.g., through laser-range finding or other known means).

Figure 6:
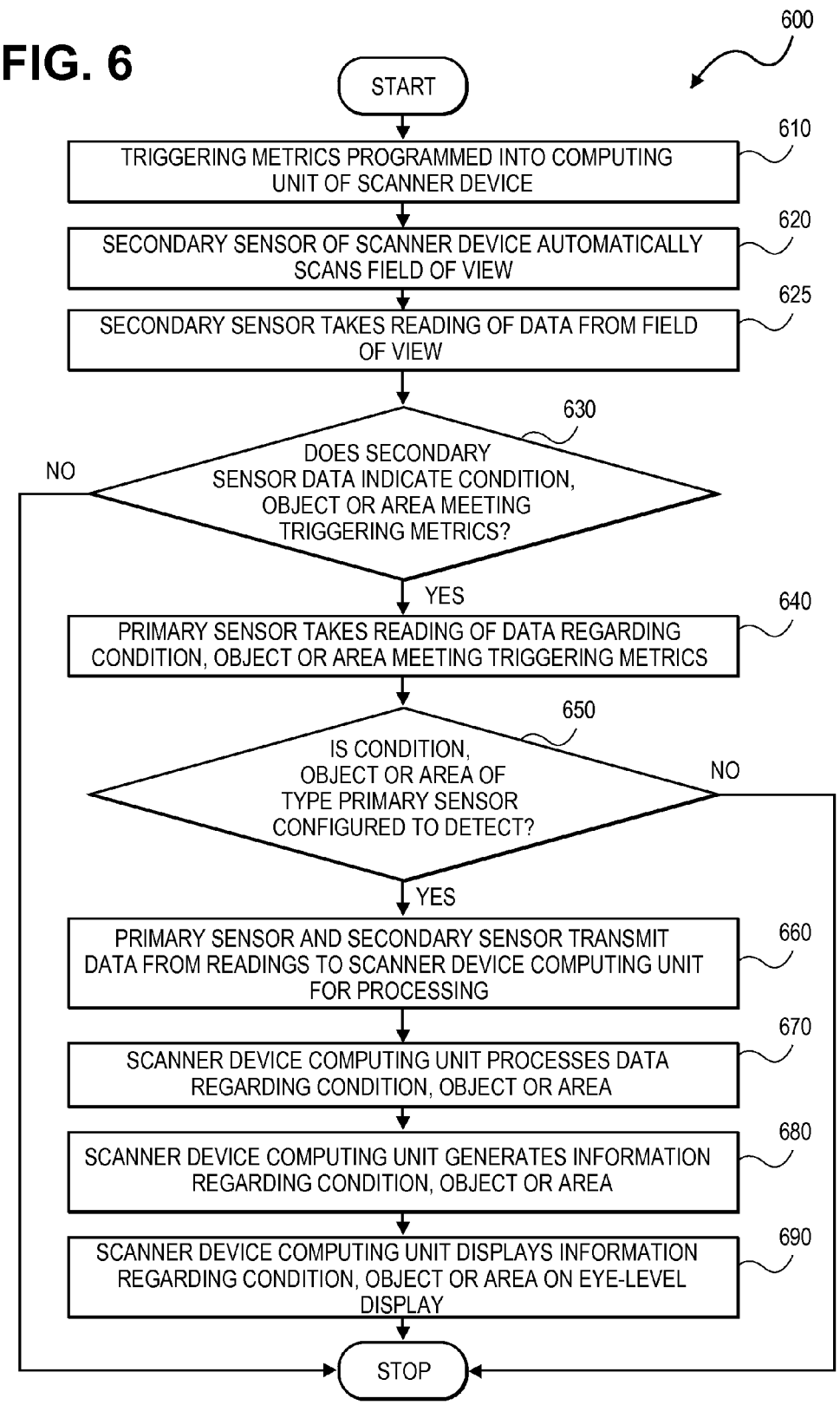
FIG. 6 is a flow chart of one process for evaluating items using eye-level scanners, in accordance with embodiments of the present disclosure.

As is discussed above, the systems and methods of the present disclosure may be configured to observe one or more metrics through the use of a sensor mounted to a wearable scanning device, and to cause or modify the operation of the sensor, or another sensor, based on the one or more metrics. Referring to FIG. 6, a flow chart 600 representing one embodiment of a process for evaluating items using eye-level scanners is shown. At box 610, a set of triggering metrics is programmed into a computing unit of a scanner device, such as the computing unit 212 of the glasses 210 of FIG. 2. At box 620, a secondary sensor of the scanner device automatically scans a field of view. The secondary sensor may be configured to search for items within a fixed field of view, i.e., along an axis or in a direction that may coincide with a field of a view of the user, and/or for items at or near a specific depth of field. Alternatively, the secondary sensor may be configured to evaluate dynamic fields of view, or varying depths of field, such as by rotating, translating or adjusting one or more elements of the sensor on a regular basis.

At box 625, the secondary sensor takes a reading of data, e.g., an image or other form of sensed information or data, from the field of view. At box 630, the scanner device determines whether the secondary sensor data indicates a condition, an object or an area meeting the triggering metrics. For example, referring to FIG. 5, the scanner device may determine whether the secondary sensor has identified a bar code, e.g., the bar codes 542, 550, or any other item specified in the triggering metrics. If the secondary sensor has not detected such a condition, an object or an area, then the process ends.

If the secondary sensor data indicates such a condition, an object or an area, however, then the process advances to box 640, where the primary sensor takes a reading of data regarding the condition, the object or the area. For example, referring again to FIG. 5, if the secondary sensor identifies a marking as a bar code, the primary sensor may capture an image of or otherwise read the bar code. At box 650, the scanner device determines whether the condition, the object or the area is of the type that the primary sensor is configured to detect. If the condition, the object or the area is not of the type that may be detected by the primary sensor, then the process ends.

If the condition, the object or the area is of the type that may be detected by the primary sensor, however, then the process advances to box 660, where the primary sensor and the secondary sensor transmit data from their respective readings to a scanner device computing unit for processing. For example, if a bar code recognized by the secondary sensor may be read and interpreted by the primary sensor, then the primary sensor sends information to the computing unit, such as an image of the bar code from the camera 220 to the computing unit 212 of FIG. 2, or a code (e.g., a set of text, numbers or other characters) obtained from an analysis of the bar code.

At box 670, the scanner device computing unit processes the data received from the primary sensor and the secondary sensor, and at box 680, the scanner device computing unit generates information regarding the condition, the object or the area analyzed by the primary sensor and the secondary sensor. For example, referring again to FIG. 5, a computing unit may identify a space 542, 536, based on a reading of the bar codes 544, 538, or a recognition of the presence or absence of the items therein, and may generate information regarding such spaces or items, e.g., "Space 542 is Empty," or "Twelve Bottles of Chardonnay in Space 536," accordingly. At box 690, the scanner device computing unit may cause such information to be displayed on an eye-level display of the scanner device, e.g., the eye-level display 140 of the eye-level scanners 110 of FIG. 1A, 1B or 1C, and the process ends. Alternatively, the scanner device computing unit may cause such information to be displayed on another computer display, such as the auxiliary display 270 of FIG. 2, or provided to the user by way of another output device, such as an audio speaker or printer, or in another format, such as a text message or electronic mail message.

Accordingly, the systems and methods may provide two or more cameras or other sensors that may work in concert with one another to recognize any conditions, objects or areas based on one or more triggering metrics associated with one or more of the sensors. When such a triggering metric is recognized, information regarding the triggering metric, or the condition, the object or the area, may be provided to the user in any format, such as on an eye-level display, or by way of any other output device.

Figure 7:
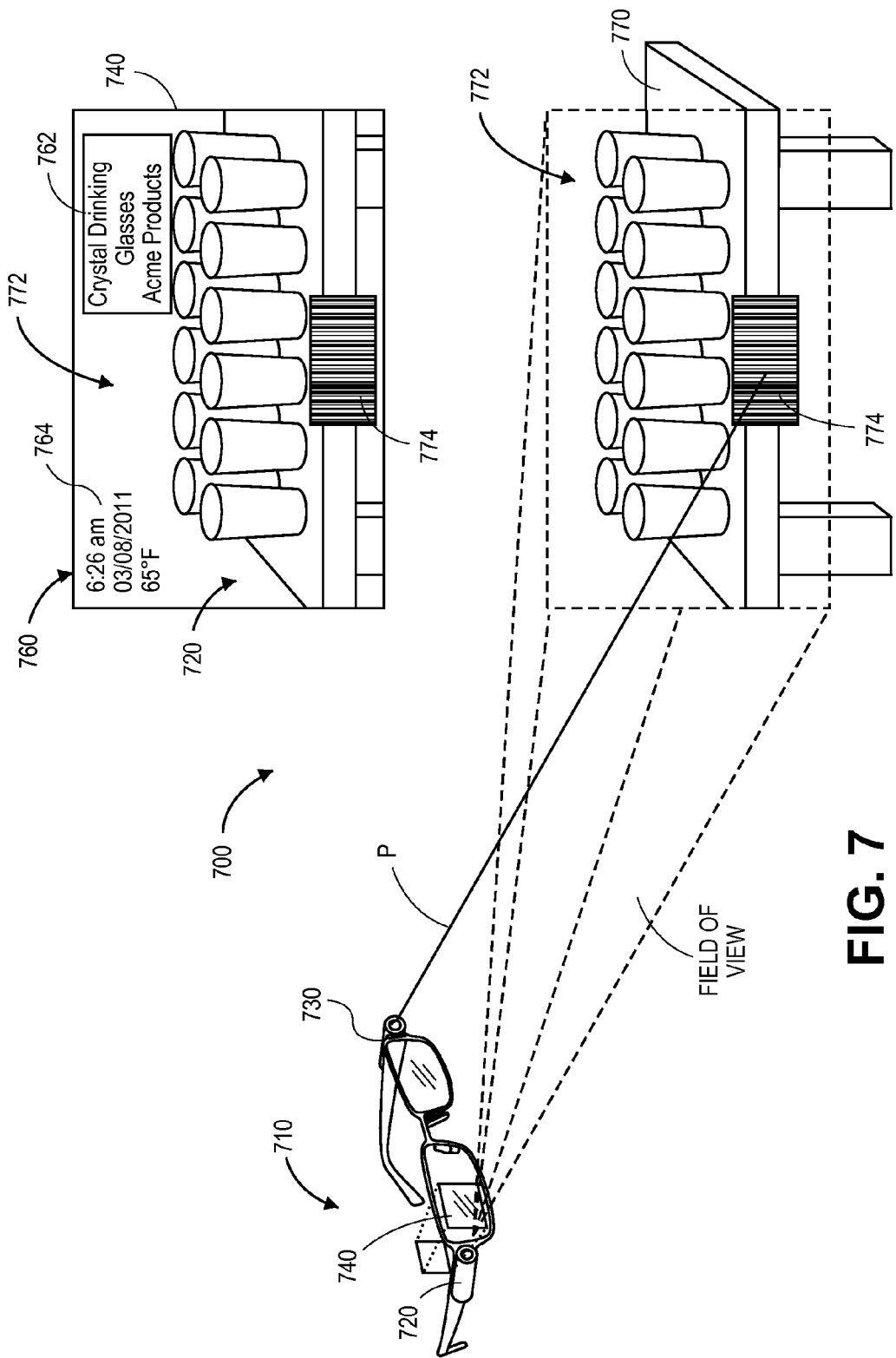
FIG. 7 is a system including an eye-level scanner in use, in accordance with embodiments of the present disclosure.

Referring to FIG. 7, a system 700 including an eye-level scanner 710 in use is shown. The eye-level scanner 710 includes a camera 720, a sensor 730 and an eye-level display 740. The camera 720 defines a field of view including an area 770 having an object 772 with an associated marking 774 thereon (e.g., a bar code), and the sensor 730 includes a pointer P that illuminates the marking 774. As is also shown in FIG. 7, information 760 regarding the area 770, the object 772 or the marking 774 may be shown on a user interface on the eye-level display 740.

As is discussed above, any type of information may be obtained using primary or secondary cameras or sensors in accordance with the present disclosure, and provided to the user. For example, the sensor 730 may locate the marking 774 on the object 772 and determine a range between the eye-level scanner 710 and the marking 774, or capture any other available information regarding an environment in which the eye-level scanner 710 is located. The camera 720 may capture one or more images of the marking 774, the object 772 or the area 770, and interpret the images to identify information 760 accordingly.

The information 760 may be identified or accessed by any means or method. For example, the camera 720 or the sensor 730 may recognize the object 772 or the area 770 based on one or more images thereof. The camera 720 may be instructed to capture a plurality of images of the object 772 or the area 770, to form a collage, or to process such images collectively through one or more photogrammetric analyses, which may be configured to identify not only outlines of objects but also specific items within images, including but not limited to trademarks, characters or other text. For example, referring again to FIG. 7, the object 772 or the area 770 may be recognized as being or including drinking glasses through one or more object recognition techniques. Alternatively, the camera 720 or sensor 730 may recognize the object 772 or the area 770 based on the marking 774 associated therewith.

As is shown in FIG. 7, the information 760 may be presented to the user on the eye-level display 740, which may be any type or form of computer display associated with the scanner 710 and accessible or visible to a user thereof. The information 760 includes an identifier 762 of the objects recognized, as well as an inset 764 including other information 764 regarding the objects, viz., a time and date at which the information is identified, as well as a temperature of the space in which the objects are located, which may be identified or determined using one or more of the camera 720 or the sensor 730.

As is also discussed above, the wearable computer devices or wearable scanner devices of the present disclosure may, upon identifying or otherwise recognizing any conditions, objects or areas based on one or more triggering metrics associated with one or more sensors, provide instructions or other information to a user or wearer of such devices regarding the triggering metrics, even where such triggering metrics are not identified within the field of view of the user or wearer. The instructions may be provided to the user or wearer directly, i.e., on one or more computer displays or through one or more other output devices. Alternatively, the instructions may be automatically implemented, i.e., such as by automatically training or repositioning a second sensor after identifying or recognizing a condition, an object or an area using a first sensor.

Figure 8:
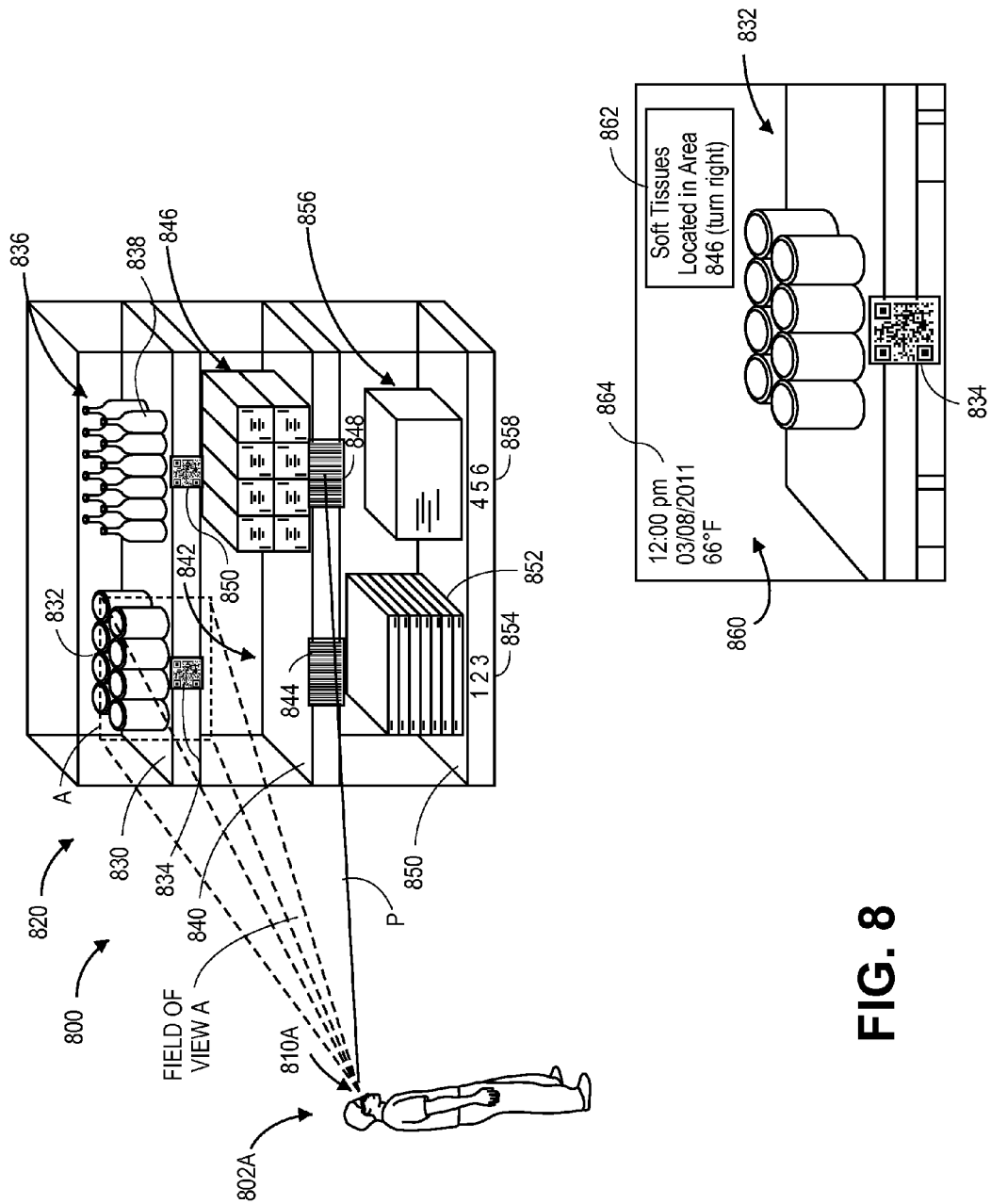
FIG. 8 is a system including an eye-level scanner in use, in accordance with embodiments of the present disclosure.

Referring to FIG. 8, a system 800 including an eye-level scanner 810 worn by a user 802 is shown. Except where otherwise noted, reference numerals preceded by the number "8" in FIG. 8 indicate components or features that are similar to components or features having reference numerals preceded by the number "7" shown in FIG. 7.

The eye-level scanner 810 of FIG. 8 may include a camera, a sensor and an eye-level display. As is shown in FIG. 8, the user 802 is placing a portion of a shelving system 820 having a plurality of shelves 830, 840, 850 in a field of view of the camera 820. The shelves 830, 840, 850 include spaces 832, 836, 842, 846, 852, 856 for accommodating items, as well as identifiers 834, 838, 844, 848, 854, 858 associated with such spaces.

When the user 802 views a first space 832 of the shelves 830, 840, 850 with the camera, information 860 regarding the first space 832, including images of the items stored thereon, may be displayed on the eye-level display. Concurrently, the sensor may scan an environment in which the eye-level scanner 810 is located, and identify another marking 848 on items in a second space 846 which may be associated with one or more triggering metrics. When the sensor recognizes the marking 848, information regarding the marking 848 may be provided to the user 802, e.g., on an eye-level display such as the eye-level display 140 of FIG. 1A, 1B or 1C. For example, as is shown in FIG. 8, the information 860 includes an instruction 862 (viz., "Soft Tissues Located in Area 846 (turn right)") notifying the user 802 that a specific item may be located outside of his or her field of view, and recommending that the user 802 reorient his or her field of view to locate the item. Any other information or data regarding the first space 832, or the second space 850, may be captured or recognized by the camera or the sensor, and presented to the user 802 or other users by way of an eye-level display or another output device, such as the auxiliary display 270, the computer 252 or the computer 262 of FIG. 2.

Additionally, those of ordinary skill in the pertinent art will recognize that the instruction 862 may further automatically operate one or more components of the present disclosure. For example, instead of displaying the instruction 862, viz., "Soft Tissues Located in Area 846 (turn right)," on the eye-level display 840, the systems and methods disclosed herein may cause a camera or any other associated component of the eye-level scanner 810 to be repositioned, such as by automatically rotating the camera upon an identification of the marking 848. Any instruction may be provided, either to a user directly, or automatically to one or more components (e.g., cameras, sensors or displays on the eye-level scanner 810 or another device), based on information identified by a camera or a sensor in accordance with the present disclosure.

Figure 9:
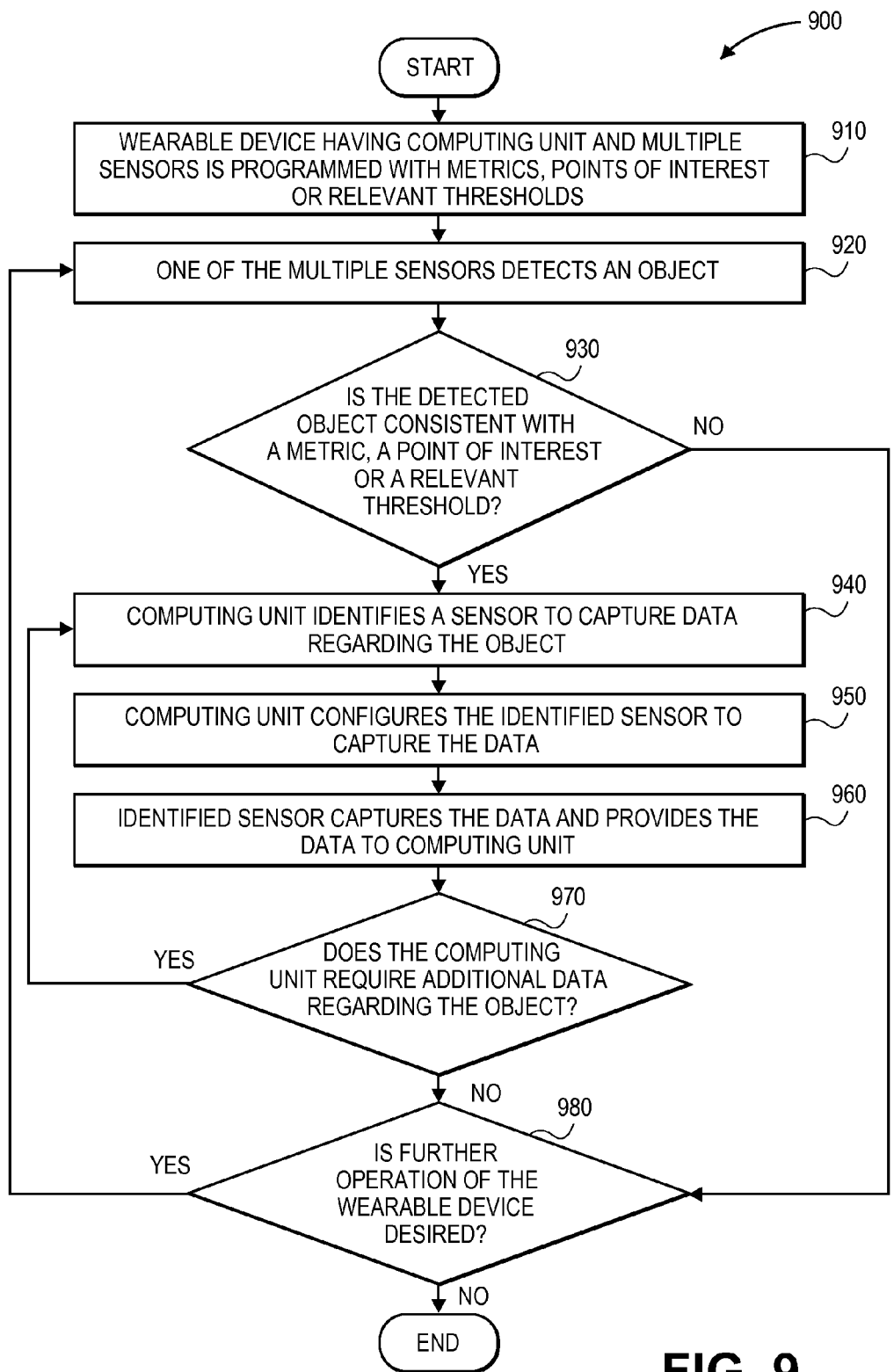
FIG. 9 is a flow chart of one process for evaluating items using eye-level scanners, in accordance with embodiments of the present disclosure.

The systems and methods of the present disclosure may further selectively operate one or more sensors in order to gather information regarding any objects or features having any associated metrics, points of interest or relevant thresholds. Referring to FIG. 9, a flow chart 900 representing one embodiment of a process for evaluating items using eye-level scanners is shown. At box 910, a wearable device having a computing unit and multiple sensors is programmed with information regarding metrics, points of interest and relevant thresholds. Such information may correspond to any items, conditions, statuses or events that may be encountered in an environment in which the wearable device is situated, or an environment in which the wearable device may be reasonably expected to be utilized.

At box 920, one of the multiple sensors detects an object. The object may be identified in any manner, such as when the object is located within a field of view of a sensor, or following an automatic scan performed by the sensor. At box 930, it is determined whether the detected object is consistent with one of the metrics, points of interest or relevant information. For example, if the sensor identifies an item having a specific feature, a specific temperature or a specific radiation level, the wearable device may determine whether the feature, the temperature or the radiation level satisfies one of the metrics, is a point of interest or exceeds a particular threshold.

If the detected object is consistent with one or more of the metrics, points of interest or relevant thresholds, then the process advances to box 940, where a computing unit on the wearable device identifies a sensor to capture data regarding the object. For example, where an item is detected using a sensor configured to perform a specific function, such as to capture images or read bar codes, QR codes, bokodes, characters, numbers, symbols, or colors that are located within a specific depth of field, the computing unit may identify one of the sensors that may be adapted to gather further data regarding the item.

At box 950, the computing unit configures the identified sensor to capture further data regarding the detected object. For example, the computing unit may modify a setting on the sensor that originally detected the object, e.g., by changing a focal length or shutter speed of a camera, or may program another sensor to take further readings of data regarding the object. At box 960, the identified sensor captures the data and provides the data to the computing unit.

At box 970, the computing unit determines whether additional data regarding the object is required. If any further information regarding the object is required, then the process returns to box 940, where a sensor is identified for the purpose of gathering further information. If no further information regarding the object is required, then the process advances to box 980, where the computing unit determines whether further operation of the wearable device is required. If any further operation is desired, then the process returns to box 920, where a sensor detects an object. If no further operation is desired then the process ends.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although many of the embodiments described herein or shown in the accompanying figures refer to the use of wearable computer devices or wearable scanner devices in the fulfillment of orders of items that have been place at an online marketplace, viz., at fulfillment centers, the systems are not so limited, and may be utilized in connection any relevant application in which the use of cameras or sensors to provide information to users may be desired.

Likewise, references to a "primary" or "first" camera or sensor, or a "secondary" or "second" camera or sensor, are ordinal in nature, and do not imply any limitation in the capacity or function of either camera or sensor. Rather, except where otherwise expressly noted herein, a "primary" or "first" camera or sensor may perform the same functions as a "secondary" or "second" camera or sensor, and vice versa.

Furthermore, any type of sensor or sensing device may be utilized by or associated with a wearable computing device of the present disclosure, including but not limited to microphones, air monitoring sensors (e.g., oxygen, ozone, hydrogen, carbon monoxide or carbon dioxide sensors, or smoke detectors), speedometers, pressure monitoring sensors (e.g., barometers), infrared sensors, ozone monitors, pH sensors, magnetic anomaly detectors, metal detectors, radiation sensors (e.g., Geiger counters, neutron detectors, alpha detectors), altimeters, attitude indicators, depth gauges, gyroscopes, compasses, accelerometers, position detectors (e.g., detectors using one or more Global Positioning Satellite systems), or the like.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 4 and 6, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method comprising:
   providing a wearable apparatus having a primary imaging device, a secondary imaging device, at least one computer processor and at least one memory device;
   storing instructions for identifying a type of item attribute in the at least one memory device;
   capturing at least one first image of an object using the secondary imaging device;
   analyzing the at least one first image to determine whether the at least one first image includes an item attribute of the type;
   in response to determining that the at least one first image includes the item attribute of the type,
     adjusting the primary imaging device to place at least a portion of the object in a field of view of the primary imaging device;
     capturing at least one second image of the object using the primary imaging device; and
     storing an association between the attribute and the at least one second image in at least one data store.

2. The method of claim 1, further comprising:
   determining at least one of a direction or a distance to the object using the secondary imaging device,
   wherein the primary imaging device is adjusted based at least in part on the direction or the distance.

3. The method of claim 1, further comprising:
   generating information regarding the object based at least in part on one of the at least one first image or the at least one second image; and
   causing a presentation of at least a portion of the information regarding the object.

4. The method of claim 3, wherein the at least a portion of the information is presented on the wearable apparatus.

5. The method of claim 1, wherein the item attribute is at least one of a bar code, a QR code, a bokode, a character, a number, a symbol, or a color.

6. A non-transitory computer-readable medium having computer-executable instructions stored thereon,
   wherein the instructions, when executed, cause a computer system having at least one computer processor to perform a method comprising:
   operatively associating a first imaging device with a first sensor, wherein an apparatus having at least one of the first imaging device or the first sensor mounted thereon is adapted to be worn on a body;
   selecting information regarding at least one defined attribute;
   receiving with the first sensor information regarding an environment in which the apparatus is located;
   determining that the information regarding the environment is associated with the at least one defined attribute;
   generating a signal regarding the at least one defined attribute; and
   operating the first imaging device in response to the signal.

7. The non-transitory computer-readable medium of claim 6, wherein operating the first imaging device in response to the signal further comprises:
   capturing at least one image of an object using the first imaging device.

8. The non-transitory computer-readable medium of claim 7, wherein operating the first imaging device in response to the signal further comprises:
   adjusting the first imaging device based at least in part on the information regarding the environment.

9. The non-transitory computer-readable medium of claim 7, wherein operating the first imaging device in response to the signal further comprises:
   determining at least one of a distance to the object or a direction to the object based at least in part on the information regarding the environment; and
   wherein the first imaging device is adjusted based at least in part on the distance to the object or the direction to the object.

10. The non-transitory computer-readable medium of claim 7, wherein the method further comprises:
    generating information regarding the object based at least in part on the at least one image of the object; and
    causing a presentation of at least some of the information regarding the object.

11. The non-transitory computer-readable medium of claim 10, wherein the object is at least one of a bar code, a QR code, a bokode, a character, a number, a symbol or a color, and wherein generating information regarding the object based at least in part on the at least one image of the object comprises:
    decoding the object; and identifying the at least one item based at least in part on the decoded object.

12. The non-transitory computer-readable medium of claim 10, wherein the at least one computer display is mounted to the apparatus.

13. The non-transitory computer-readable medium of claim 7, wherein the method further comprises:
generating information regarding the object based at least in part on the at least one image of the object; and
determining at least one attribute of the object based at least in part on the information regarding the object.

14. The non-transitory computer-readable medium of claim 7, wherein the method further comprises:
generating information regarding the object based at least in part on the at least one image of the object; and
transmitting at least some of the information regarding the object to an external computer device over a network.

15. The non-transitory computer-readable medium of claim 6, wherein the method further comprises:
sending for display at least some of the information regarding the environment.

16. The non-transitory computer-readable medium of claim 6, wherein the first sensor is a second imaging device, and
wherein the information regarding the environment comprises an image captured by the second imaging device.

17. The non-transitory computer-readable medium of claim 6, wherein the information regarding the environment comprises at least one of a color, a temperature or a location.

18. The non-transitory computer-readable medium of claim 6, wherein the apparatus further comprises a wearable frame, and
wherein the at least one of the first imaging device or the first sensor is mounted to the wearable frame.

19. The non-transitory computer-readable medium of claim 18, wherein the wearable frame is adapted to be worn about a head of the body; and
wherein the first imaging device and the first sensor are mounted to the wearable frame.

20. The non-transitory computer-readable medium of claim 6, wherein the first sensor is at least one of:
an imaging device;
a microphone;
an air monitoring sensor;
a pressure monitoring sensor;
an infrared sensor;
a radiation sensor; or
a position sensor.

21. A wearable computer system comprising:
a primary imaging device mounted to a frame, wherein the frame is adapted to be worn on at least a portion of a human body;
a secondary sensor mounted to the frame;
a computing device in communication with at least one of the primary imaging device or the secondary sensor, wherein the computing device is configured to implement one or more services, and
wherein the one or more services are configured to:
identify information regarding a plurality of triggering events in at least one data store;
capture information using the secondary sensor;
determine whether a triggering event has occurred based at least in part on the information captured using the secondary sensor;
in response to determining that the triggering event has occurred,
capture at least one image using the primary imaging device; and
store an association between the at least one image and the triggering event in the at least one data store.

22. The wearable computer system of claim 21, wherein the one or more services are further configured to:
determine at least one of a distance associated with the triggering event or a direction associated with the triggering event; and
adjust the primary imaging device based at least in part on the distance or the direction associated with the triggering event.

23. The wearable computer system of claim 21, wherein the one or more services are further configured to:
generate information regarding the triggering event based at least in part on the at least one image captured using the primary imaging device.

24. The wearable computer system of claim 23, further comprising at least one computer display,
wherein the one or more services are further configured to:
cause a display of at least some of the information regarding the triggering event on the at least one computer display.

* * * * *